(12) United States Patent
Gooden

(10) Patent No.: US 9,835,060 B2
(45) Date of Patent: Dec. 5, 2017

(54) THERMOSTATIC BYPASS VALVE

(71) Applicant: FORD GLOBAL TECHNOLOGIES, LLC, Dearborn, MI (US)

(72) Inventor: James Thomas Gooden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 828 days.

(21) Appl. No.: 14/164,664

(22) Filed: Jan. 27, 2014

(65) Prior Publication Data

US 2015/0211395 A1 Jul. 30, 2015

(51) Int. Cl.
| | |
|---|---|
| *F01P 1/06* | (2006.01) |
| *F01M 5/00* | (2006.01) |
| *F01P 11/08* | (2006.01) |
| *F16H 57/04* | (2010.01) |
| *F16H 61/48* | (2006.01) |
| *F16H 61/00* | (2006.01) |

(52) U.S. Cl.
CPC ............. *F01M 5/007* (2013.01); *F01P 11/08* (2013.01); *F16H 57/0413* (2013.01); *F16H 57/0417* (2013.01); *F01P 2060/045* (2013.01); *F16H 61/48* (2013.01); *F16H 2061/0037* (2013.01)

(58) Field of Classification Search
CPC .. F01M 5/007; F01P 11/08; F16H 2061/0037; F16H 57/0413; F16H 57/0417; F16H 61/48
USPC .................................................... 123/41, 196
See application file for complete search history.

(56) References Cited

U.S. PATENT DOCUMENTS

| 4,273,082 | A | * | 6/1981 | Tholen | ..................... F01P 11/08 123/41.31 |
| 6,044,645 | A | * | 4/2000 | Greenan | ............. F16H 57/0412 60/337 |
| 6,065,682 | A | * | 5/2000 | Frunzetti | .................... F01P 7/16 236/12.15 |
| 6,253,837 | B1 | | 7/2001 | Seiler et al. | |
| 6,772,958 | B1 | | 8/2004 | Lamb et al. | |
| 7,469,841 | B1 | | 12/2008 | Lamb et al. | |
| 7,617,700 | B2 | | 11/2009 | Lamb et al. | |
| 8,490,885 | B2 | | 7/2013 | Lamb et al. | |
| 2006/0060345 | A1 | * | 3/2006 | Flik | ........................... F01P 3/20 165/297 |
| 2008/0093066 | A1 | * | 4/2008 | Bird | ....................... F01M 5/005 165/297 |
| 2009/0101312 | A1 | * | 4/2009 | Gooden | .............. F16H 57/0413 165/104.19 |

(Continued)

*Primary Examiner* — Henry Crenshaw
(74) *Attorney, Agent, or Firm* — James Dottavio; Brooks Kushman P.C.

(57) ABSTRACT

A thermostatic bypass valve functions to regulate fluid temperature and also to act as a pressure relief valve using a single valve bore. The poppet valve includes a cylinder with a chamber that is thermally immersed in a source passageway such that the valve state is determined by the temperature of the fluid flowing through the source passageway as opposed to the fluid flowing through a return passageway. When the fluid in the source passageway is hot, a poppet is forced against the return passageway side of a valve seat. The poppet may either be rigidly attached to the cylinder or may slide with respect to the cylinder and be forced against the valve seat by a spring. A piston may either be rigidly attached to the housing or may be forced toward the valve seat by a spring.

12 Claims, 7 Drawing Sheets

(56) References Cited

U.S. PATENT DOCUMENTS

| | | | |
|---|---|---|---|
| 2009/0114183 A1* | 5/2009 | Moser | G01K 5/62 123/196 AB |
| 2010/0213401 A1* | 8/2010 | Martin | F01M 5/007 251/321 |
| 2011/0061744 A1* | 3/2011 | Zillig | F15B 21/042 137/15.01 |
| 2012/0247582 A1 | 10/2012 | Lamb et al. | |

\* cited by examiner

THERMOSTATIC BYPASS VALVE

TECHNICAL FIELD

This disclosure relates to the field of valves. More particularly, the disclosure pertains to a transmission cooler bypass valve.

BACKGROUND

FIG. 1 illustrates a vehicle powertrain. Heavy lines indicate mechanical power flow whereas thin lines indicate flow of transmission fluid. Engine 10 drives torque converter 12 which, in turn, drives gearbox 14. Gearbox 14 may adjust the speed and torque before transmitting the mechanical power to an output shaft. The gear ratio of gearbox 14 is selected by providing pressurized fluid to hydraulically actuated clutches. Pump 16, driven mechanically by engine 10, draws fluid from sump 18. Valve body 20 routes the pressurized fluid to the torque converter and to the clutches within gearbox 14 that establish the desired gear ratio. The fluid also provides lubrication to gearbox 14 and absorbs heat. The fluid then returns to sump 18.

The transmission operates most efficiently when the fluid is at an optimal temperature. When the fluid is too cold, its viscosity is higher increasing parasitic drag. If the fluid gets too hot, the viscosity is too low resulting in increased leakage around the pump and elsewhere. This increased leakage reduces the pressure available from pump 16 reducing the torque capacity of the clutches within gearbox 14. If the fluid temperature remains high for a sufficient period of time, the friction characteristics of the clutches change and shift quality degrades. The temperature of the fluid is controlled by routing the lubrication fluid through cooler 22 and bypass valve 24. The cooler is a heat exchanger with a fluid loop designed to facilitate heat transfer either directly to ambient air, or to an intermediate medium such as liquid coolant. When the fluid temperature is high, lubrication fluid is routed through cooler 22 before entering the gearbox 14. When the fluid temperature is low, on the other hand, bypass valve 24 routes the fluid directly to gearbox 14 bypassing the cooler and thus permitting the fluid to warm up quicker. Note that, although valve body 20 and bypass valve 24 are illustrated in FIG. 1 as distinct components, some embodiments may integrate bypass valve 24 into the valve body.

Some pressure drop is normal as the fluid flows through cooler 22. However, in some conditions, the resistance may be excessive resulting in an unacceptable pressure drop. This can occur, for example, when the fluid in the cooler fluid loop is very cold and therefore has very high viscosity. The fluid within the cooler can be cold even when the fluid circulating within the transmission has warmed up because the bypass valve has been segregating the fluid. In some cases, the resistance is high enough to completely block the flow through the lubrication and cooling circuit of the transmission, risking damage to components of the gearbox.

SUMMARY OF THE DISCLOSURE

A transmission system includes a heat exchanger with an inlet and an outlet. A housing defines a source passageway between a source of pressurized fluid and the inlet, a return passageway between the outlet and a transmission lubrication circuit, and a bypass passageway between the source passageway and the return passageway. A poppet valve within the bypass passageway performs several functions. First, the poppet valve permits flow through the bypass passageway when a temperature in the source passageway is less than a predefined temperature. Second, the poppet valve permits flow through the bypass passageway when a pressure difference between the source passageway and the return passageway exceeds a predefined value. Finally, the poppet valve blocks flow through the bypass passageway in other conditions. The poppet valve includes a cylinder defining a chamber containing a phase change material such that the chamber is thermally immersed in the source passageway. The cylinder slides within the bypass passageway towards the source passageway in response to an increase in a volume of the phase change material which may be a wax. A return spring forces the cylinder away from the source passageway in response to a decrease in the volume of the phase change material. In some embodiments, the poppet valve may include a poppet rigidly attached to the cylinder. A pressure relief valve may force a piston towards the source passageway. In other embodiments, the piston may be fixed with respect to the housing. The poppet valve may include a poppet that slides with respect to the cylinder and a pressure relief spring that pushes the poppet toward the valve seat.

A thermostatic bypass valve includes a housing defining a bypass passageway between a source passageway and a return passageway. The bypass passageway includes a valve seat. A piston and a cylinder define a chamber containing a phase change material which may be wax. The chamber is thermally immersed in the source passageway. A spring forces a poppet against the valve seat, on the return passageway side, when the phase change material is in a liquid state. In some embodiments, the poppet may be rigidly fixed to the cylinder. In other embodiments, the poppet may slide with respect to the cylinder and a pressure relief spring may force the poppet toward the valve seat. In some embodiments, the piston may be rigidly fixed to the housing. In other embodiments, a pressure relief spring may force the piston towards the valve seat.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
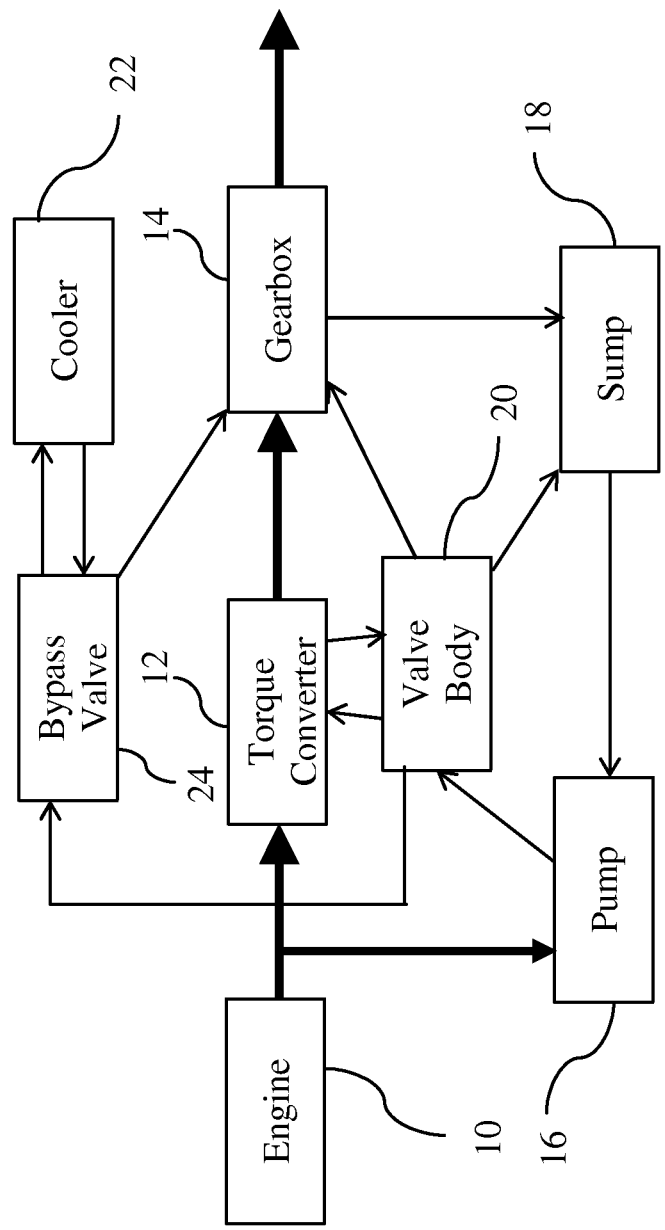
FIG. 1 is a schematic representation of a vehicle powertrain.
Figure 2:
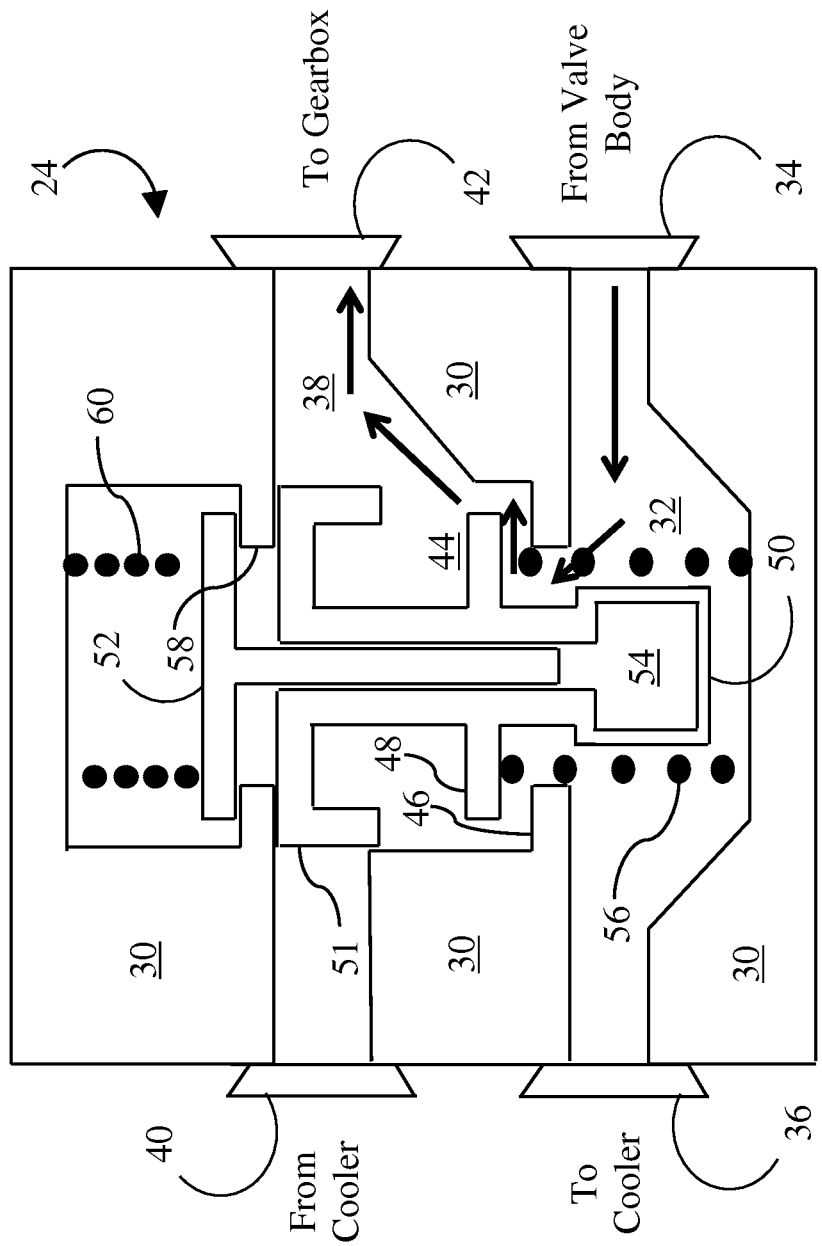
FIG. 2 is a diagram showing a first embodiment of a thermostatic bypass valve when the fluid is cold.
Figure 3:
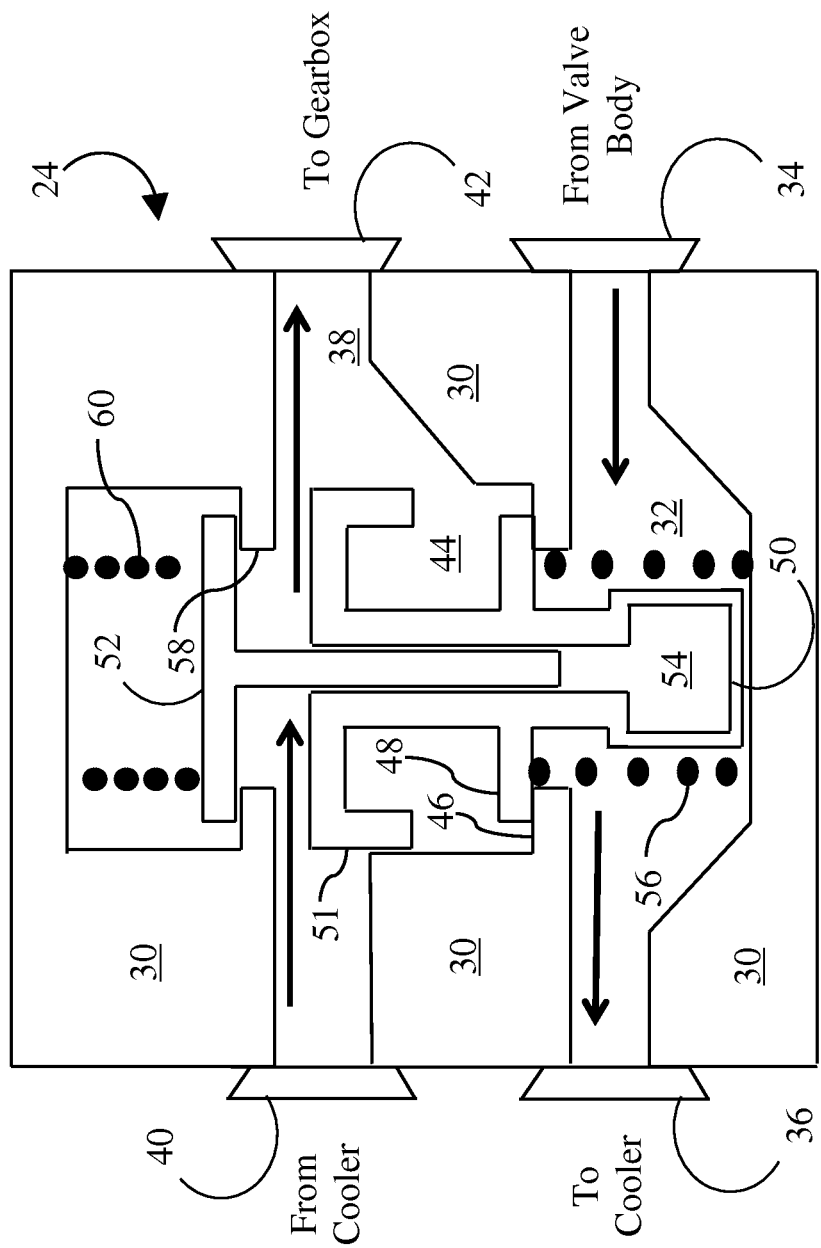
FIG. 3 is a diagram showing a first embodiment of a thermostatic bypass valve when the fluid is hot.
Figure 4:
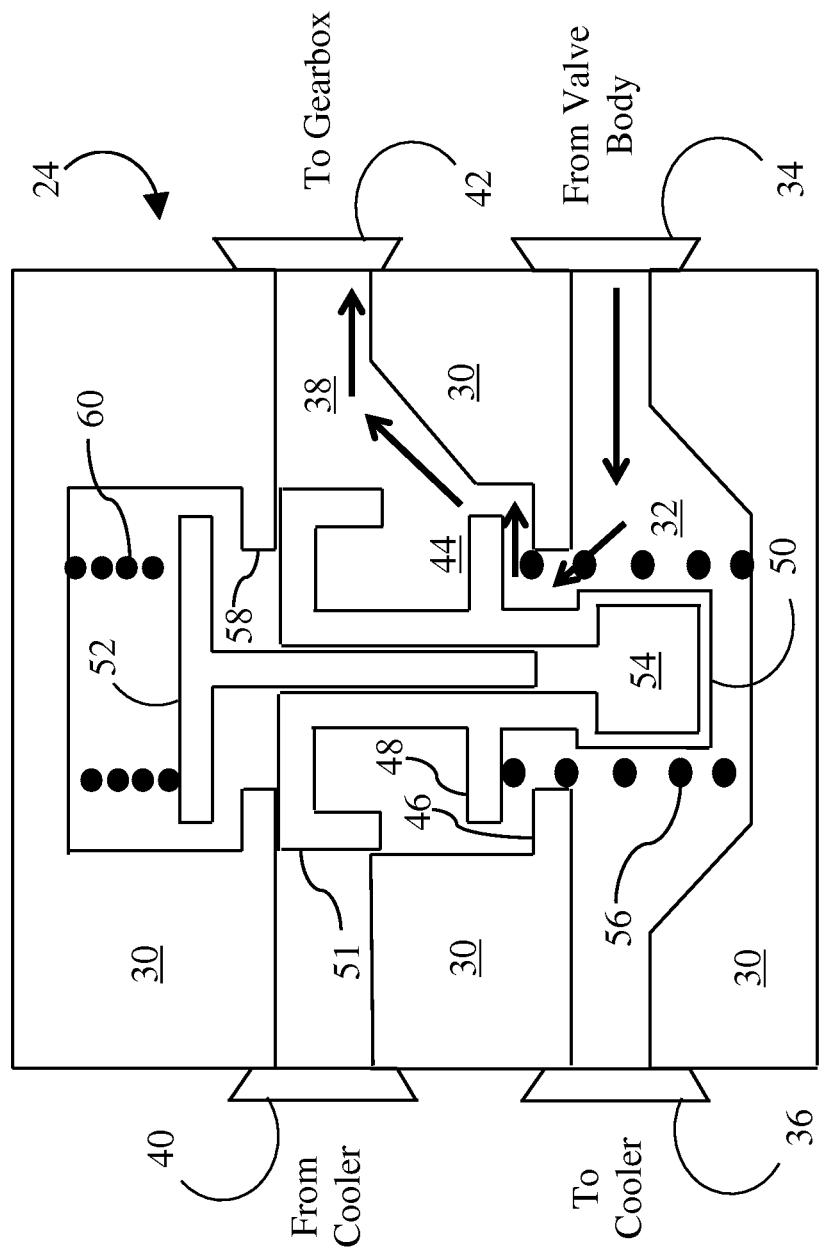
FIG. 4 is a diagram showing a first embodiment of a thermostatic bypass valve when the cooler fluid loop is blocked.

FIGS. 2-4 illustrates a first bypass valve designed to regulate fluid temperature and also to route fluid directly to the gearbox when the pressure difference between the inlet and the outlet is excessive. FIG. 2 shows bypass valve 24 when the fluid is cold. The bypass valve includes a housing 30 with three passageways. Source passageway 32 conducts pressurized fluid between inlet port 34 from the valve body to a first cooler port 36 connected and one end of the cooler fluid loop. Similarly, return passageway 38 conducts cooled fluid between a second cooler port 40 connected to the opposite end of the cooler fluid loop to outlet port 42 connected to the gearbox lubrication circuit. Bypass passageway 44 conducts fluid from source passageway 32 to return passageway 38, bypassing the cooler fluid loop. Bypass passageway 44 includes valve seat 46 between the source passageway and the return passageway. When poppet 48 is displaced away from valve seat 46, as shown in FIG. 2, fluid can flow through the bypass passageway between valve seat 46 and poppet 48. Poppet 48 is rigidly attached to cylinder 50 which is supported to move within bypass passageway 44. Cylinder 50 also includes a face 51 that blocks return passageway 38 when Cylinder 50 is in the position illustrated in FIG. 2. Alternatively, the flow could be blocked by other means such as a second poppet and a second valve seat within the return passageway.

Piston 52 slides within cylinder 50. Wax is contained within chamber 54 that is formed by cylinder 50 and piston 52. Cylinder 50 is designed such that chamber 54 is thermally immersed in the source passageway. In other words, based on the location of the chamber and the thermal conductivity of the materials, the temperature of the wax is determined primarily by the temperature of fluid within the source passageway. The temperature of fluid in the return passageway has much less, if any, impact on the temperature of the wax. The wax is formulated to have a melting point that corresponds to the desired operating temperature of the transmission fluid. When the wax is solid, its volume is relatively low, permitting piston 52 to slide deep into cylinder 50. Piston 52 is restrained by lip 58 in housing 30. Return spring 56, acting in compression, ensures that piston 50 slides as deeply into cylinder 50 as permitted by the volume of wax. Consequently, poppet 48 is held away from valve seat 46, permitting fluid to flow through the bypass passageway.

FIG. 3 shows bypass valve 24 when the fluid is hot. Because the wax in chamber 54 is thermally immersed in source passageway 32, the wax melts. Wax increases substantially in volume when it melts. Therefore, the volume of chamber 54 is relatively high forcing cylinder 50 to slide relative to piston 52, overcoming return spring 56. Piston 52 is restrained from moving by pressure relief spring 60, which acts in compression. Cylinder 50 moves toward source passageway 32 forcing poppet 48 into contact with valve seat 46. When poppet 48 is forced into contact with valve seat 46, flow through bypass passageway 44 is prevented, forcing the fluid to flow through the cooler fluid loop. The cooled fluid returns to the transmission through the return passageway 38 which is no longer blocked by face 51. Because wax chamber 54 is thermally immersed in the source passageway, bypass valve 24 will remain in this condition as long as the temperature of the fluid in the source passageway remains above the melting point of the wax. If the wax chamber were located in the return passageway, then the cooled fluid would tend to return the valve to the bypass condition.

FIG. 4 shows bypass valve 24 when the fluid is hot and the cooler fluid loop is blocked. Although pressure relief spring 60 continues to push poppet 48 toward valve seat 46, this force is overcome by a pressure difference between source passageway 32 and return passageway 38. The pressure difference displaces poppet 48 from valve seat 46 permitting fluid to flow through the bypass passageway between valve seat 46 and poppet 48. The pressure difference is determined by the force generated by pressure relief spring 60 and the area of poppet 48. These parameters are selected such that this feature is only activated when the resistance through the cooler fluid loop is excessive. If the blockage of the cooler fluid loop is only a partial blockage, then a fraction of the fluid will continue to flow through the cooler. If the partial blockage is caused by low temperatures, this flow of hot fluid will relieve the blockage. In the meantime, the transmission is provided with adequate lubrication flow at acceptable pressure.

Figure 5:
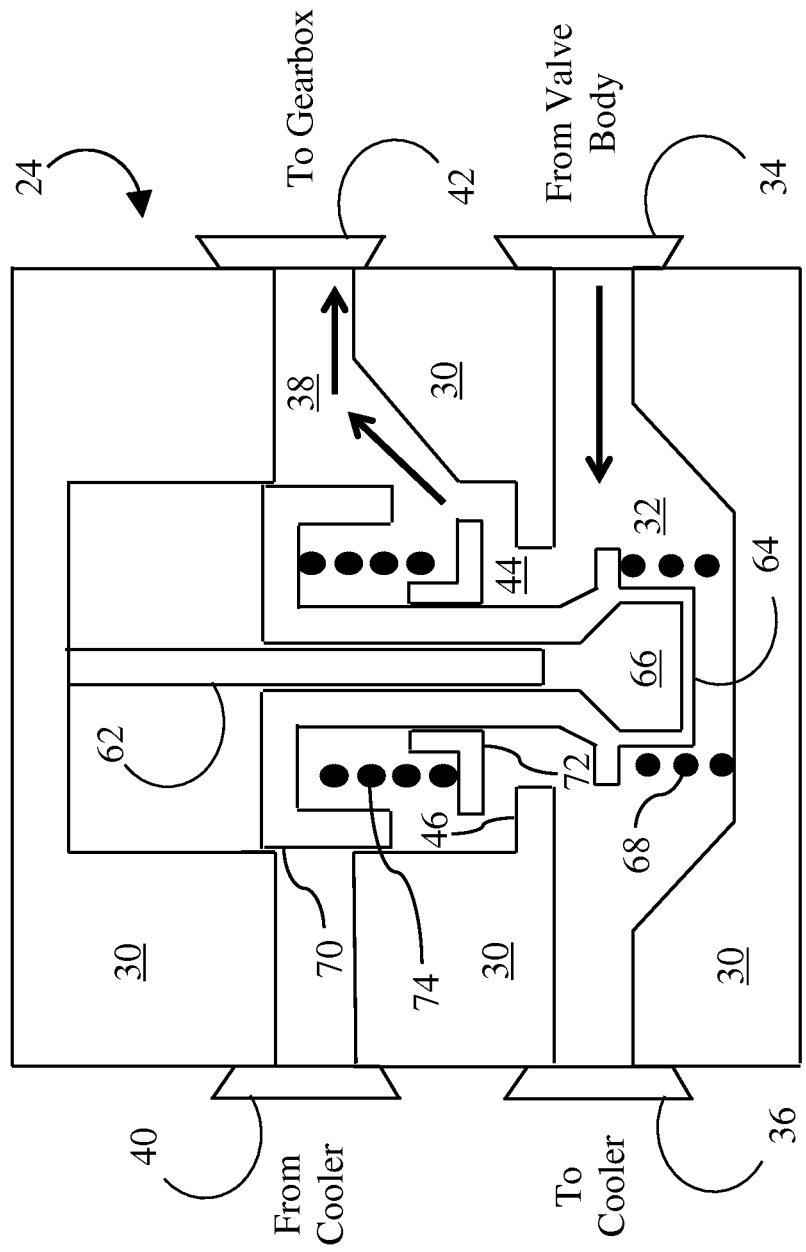
FIG. 5 is a diagram showing a second embodiment of a thermostatic bypass valve when the fluid is cold.
Figure 6:
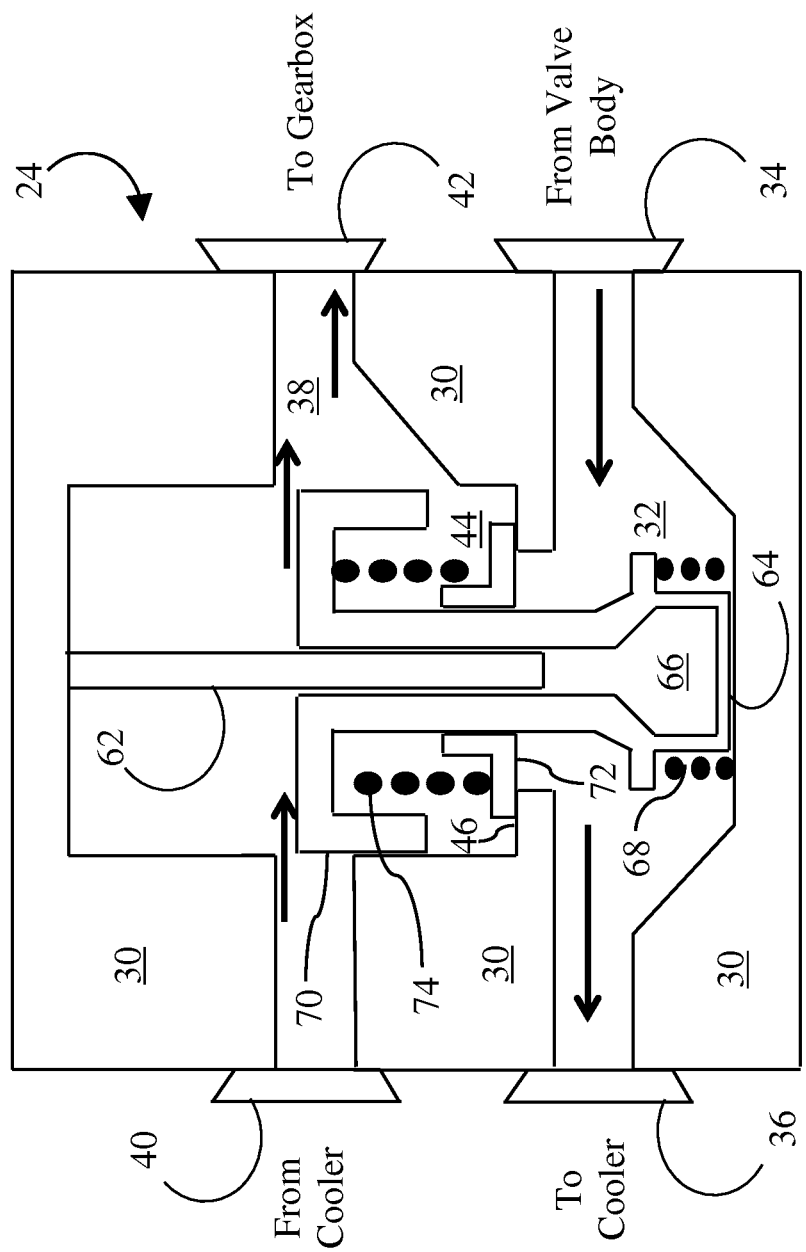
FIG. 6 is a diagram showing a second embodiment of a thermostatic bypass valve when the fluid is hot.
Figure 7:
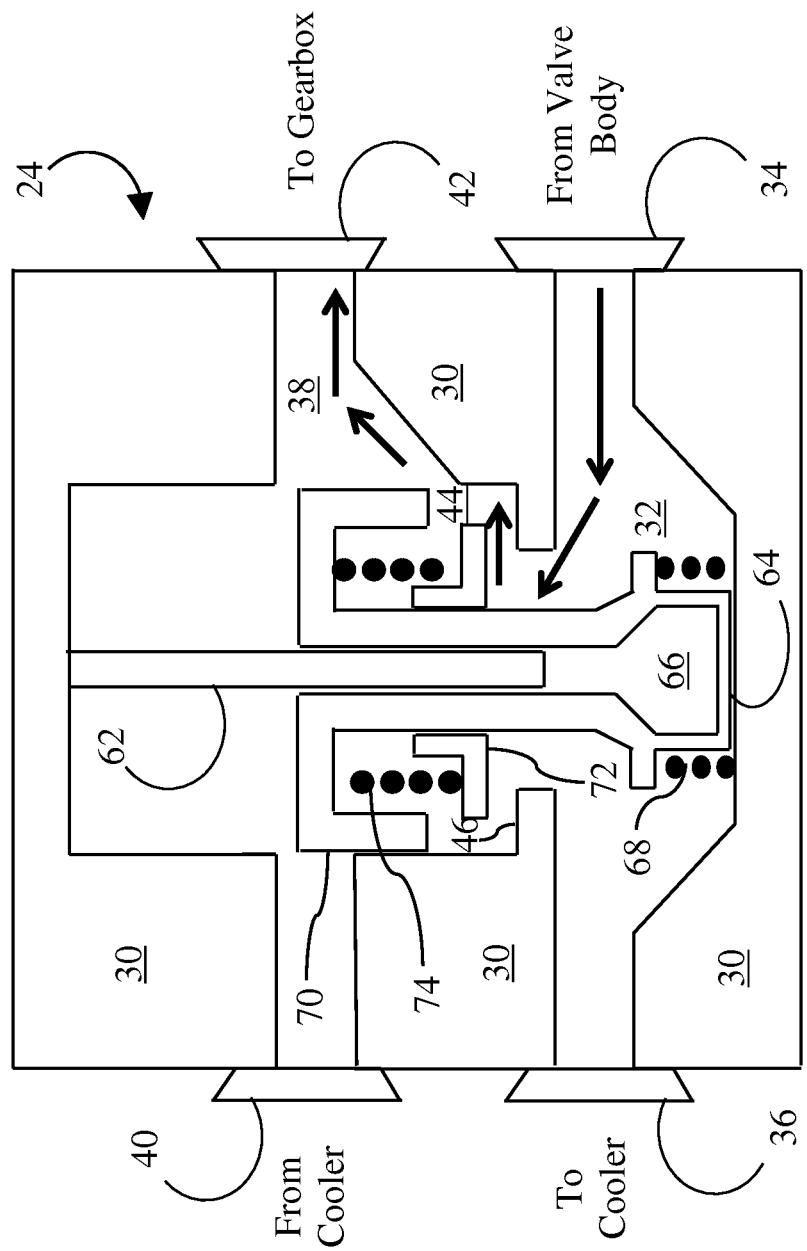
FIG. 7 is a diagram showing a second embodiment of a thermostatic bypass valve when the cooler fluid loop is blocked.

FIGS. 5-7 illustrates a second bypass valve designed to regulate fluid temperature and also to route fluid directly to the gearbox when the pressure difference between the inlet and the outlet is excessive. FIG. 5 shows bypass valve 24 when the fluid is cold. Source passageway 32, return passageway 38, and bypass passageway 44 are similar to the corresponding passageways in the first bypass valve. Piston 62 is rigidly attached to housing 30. Cylinder 64 slides with respect to piston 62. Wax in chamber 64 is thermally immersed in source passageway 32. When the wax melts, it pushes cylinder 64 toward the source passageway. When the wax solidifies, return spring 68 pushes cylinder 64 towards return passageway 38. Poppet 72 slides with respect to cylinder 62. When the wax is in a liquid state, pressure relief spring 74 pushes poppet 72 into valve seat 46. However, the free length of spring 74 is selected such that it does not force poppet 72 against valve seat 46 when the wax is in a solid state. Alternatively, a feature on the cylinder may restrict spring 74 from extending to its free length such that poppet 72 is not forced against valve seat 46 when the wax is solid.

FIG. 5 shows the bypass valve when the fluid in the source passageway is cold and the wax is solid. Spring 68 pushes cylinder 64 away from the source passageway such that face 70 blocks return passageway 70. Fluid in the source passageway easily pushes poppet 72 away from valve seat 46 permitting can flow through the bypass passageway between valve seat 46 and poppet 72.

FIG. 6 shows bypass valve 24 when the fluid is hot. Because the wax in chamber 54 is thermally immersed in source passageway 32, the wax melts forcing cylinder 64 to move against spring 68. Spring 74 forces poppet 72 into contact with valve seat 46. When poppet 48 is forced into contact with valve seat 46, flow through bypass passageway 44 is prevented, forcing the fluid to flow through the cooler fluid loop. Because wax chamber 54 is thermally immersed in the source passageway, bypass valve 24 will remain in this condition as long as the temperature of the fluid in the source passageway remains above the melting point of the wax.

FIG. 7 shows bypass valve 24 when the fluid is hot and the cooler fluid loop is blocked. Although pressure relief spring 74 continues to push poppet 72 toward valve seat 46, this force is overcome by a pressure difference between source passageway 32 and return passageway 38. The pressure difference displaces poppet 72 from valve seat 46 permitting fluid to flow through the bypass passageway. Therefore, despite the blockage, the transmission is provided with adequate lubrication flow at acceptable pressure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission system comprising:
a heat exchanger having a fluid loop with an inlet and an outlet;
a housing defining a source passageway between a source of pressurized fluid and the inlet, a return passageway between the outlet and a transmission lubrication circuit, and a bypass passageway between the source passageway and the return passageway; and
a poppet valve including a cylinder defining a chamber containing a phase change material, the chamber thermally immersed in the source passageway, the cylinder configured to slide within the bypass passageway towards the source passageway in response to an increase in a volume of the phase change material, the poppet valve configured to i) permit flow through the bypass passageway in response to a temperature in the source passageway being less than a predefined temperature, ii) permit flow through the bypass passageway when a pressure in the source passageway exceeds a pressure in the return passageway by a predefined value, and iii) block flow through the bypass passageway in response to the temperature in the source passageway exceeding the predefined temperature and the pressure difference being less than the predefined value.

2. The transmission system of claim 1 wherein the poppet valve further comprises:
a return spring configured to force the cylinder away from the source passageway in response to a decrease in the volume of the phase change material.

3. The transmission system of claim 2 wherein the poppet valve further comprises:
a poppet configured to slide with respect to the cylinder; and
a pressure relief spring configured to force the poppet towards a valve seat in the bypass passageway.

4. The transmission system of claim 3 wherein the poppet valve further comprises a piston configured to slide with respect to the cylinder and restrained from motion with respect to the housing.

5. The transmission system of claim 2 wherein the phase change material is a wax.

6. A thermostatic bypass valve comprising:
a housing defining a bypass passageway between a source passageway and a return passageway, the bypass passageway having a valve seat;
a piston and a cylinder defining a chamber containing a phase change material, the chamber completely thermally immersed in the source passageway; and
a spring configured to force a poppet against a return passageway side of the valve seat when the phase change material is in a liquid state.

7. The thermostatic bypass valve of claim 6 wherein:
the source passageway includes an inlet port and a first cooler port; and
the return passageway includes a second cooler port and an outlet port.

8. The thermostatic bypass valve of claim 7 wherein the first and second cooler ports are adapted for fluid connection to a heat exchanger.

9. The thermostatic bypass valve of claim 7 wherein the inlet port is adapted to receive pressurized fluid from a heat source and the outlet port is adapted to return fluid to the heat source.

10. The thermostatic bypass valve of claim 9 wherein the heat source is an automotive transmission.

11. The thermostatic bypass valve of claim 6 wherein the phase change material is a wax.

12. The thermostatic bypass valve of claim 6 wherein the piston is fixed to the housing and the spring forces the poppet towards the source passageway.

* * * * *